US009695862B1

(12) United States Patent
Clover

(10) Patent No.: US 9,695,862 B1
(45) Date of Patent: Jul. 4, 2017

(54) APPARATUS AND METHOD FOR CLEANING A THREADED MEMBER

(71) Applicant: Don K. Clover, Katy, TX (US)

(72) Inventor: Don K. Clover, Katy, TX (US)

(*) Notice: Subject to any disclaimer, the term of this patent is extended or adjusted under 35 U.S.C. 154(b) by 48 days.

(21) Appl. No.: 14/734,675

(22) Filed: Jun. 9, 2015

(51) Int. Cl.
F16B 37/00 (2006.01)

(52) U.S. Cl.
CPC .......... *F16B 37/002* (2013.01); *F16B 37/005* (2013.01)

(58) Field of Classification Search
CPC ........ F16B 37/002; F16B 37/005; B08B 9/02; B08B 9/021; B08B 9/023; B08B 9/032
USPC ........................................................ 411/437
See application file for complete search history.

(56) References Cited

U.S. PATENT DOCUMENTS

| 561,913 | A | 6/1896 | Paquette |
| 2,091,374 | A | 8/1937 | Pease |
| 2,600,338 | A | 6/1952 | Starr |
| 2,818,745 | A | 1/1958 | Spontelli |
| 2,896,495 | A | 7/1959 | Crawford |
| 3,501,995 | A | 3/1970 | Lanius, Jr. |
| 4,889,460 | A | 12/1989 | Laidlaw et al. |
| 4,907,930 | A | 3/1990 | Peterson |
| 5,005,244 | A | 4/1991 | Muraguchi |
| 5,326,208 | A | 7/1994 | Werner |
| 5,451,124 | A | 9/1995 | Meigs |
| 5,598,994 | A * | 2/1997 | Olewinski ........... F16B 37/0842 248/73 |
| 5,819,369 | A | 10/1998 | Falvo et al. |

FOREIGN PATENT DOCUMENTS

EP     0627569 A1    7/1994

* cited by examiner

*Primary Examiner* — Saeed T Chaudhry

(57) ABSTRACT

A thread-cleaning tool comprises a partially hollow nut for use with a pneumatic, hydraulic, or electrical nut-running power tool. The nut comprises a plurality of brushes mounted in alignment with the outside corners of the nut, and facing inward to the central orifice of the nut, such that the nut abrasively removes corrosion and particulates from the threads of a shaft. In an embodiment, the brushes of the nut are mounted upon brush assemblies comprising rotating cam members, located in recesses spaced to align with the outer corners of the nut, providing a mechanism for the brushes to move back and forth as the nut is rotated up and down the thread. The brush assemblies can be easily removed or substituted as wear and tear accumulates.

20 Claims, 4 Drawing Sheets

APPARATUS AND METHOD FOR CLEANING A THREADED MEMBER

FIELD

Embodiments usable within the scope of the present disclosure relate, generally, to apparatuses, and methods usable to apply abrasive friction to threaded members, such as flanges, studs, or bolts, for purposes of easily removing corrosion and dirt.

BRIEF DESCRIPTION OF THE DRAWINGS

In the detailed description of various embodiments usable within the scope of the present disclosure, presented below, reference is made to the accompanying drawings, in which.

Figure 1:
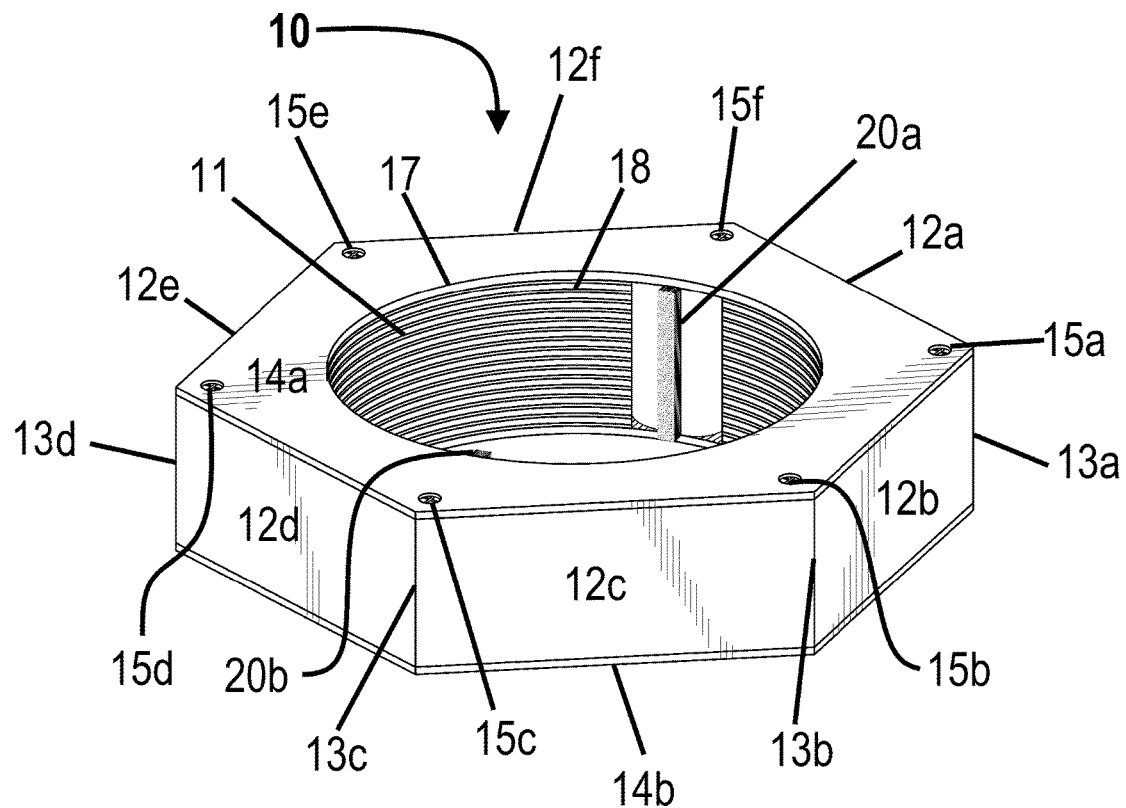
FIG. 1 depicts a top down view of an embodiment of a brush nut usable within the scope of the present disclosure.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Embodiments usable within the scope of the present disclosure include an apparatus capable of abrasively cleaning and removing corrosion and dirt from a threaded member in the field, including, but not limited to, flanges, studs, and bolts. Conventionally, such cleaning is accomplished either by manual use of abrasive brushes, or with specialized power tools designed to abrade the threaded member. Examples of such conventional power tools include U.S. Pat. No. 5,005,244 to Muraguchi, and U.S. Pat. No. 5,819,369 to Falvo. While these inventions may often utilize the same power base (e.g., electric, pneumatic) as other power tools, their design generally requires at least the attachment of a swappable brush head. Additionally, positioning the tool over and around the threaded member may not be feasible, either due to the length, or due to the member being in an inconvenient position for access.

A need therefore exists for an apparatus or method that can clean the threaded member and can be used with conventional fastening tools without requiring a separate device, or the use of unconventional angles which may be unavailable. Embodiments described in the present disclosure meet these needs. Specifically, the embodiment described herein is a specialized nut comprising a plurality of bristles positioned on the edge of the nut and pointing inwardly towards the orifice of the nut. As the nut is threaded, the bristles push into the threads of the member and drag. These bristles are generally constructed of brass or stainless steel and are of sufficient stiffness to abrasively clean a threaded member as they are used. While the invention described herein can be used in conjunction with manual turning of the nut (i.e., a wrench), preferred embodiments are utilized in conjunction with a nut-running power tool, as described, e.g., in U.S. patent application Ser. No. 13/507,102.

An advantage of the present invention is that it allows any flange, stud, or bolt to be cleaned without the need for any more tools or clearance than would be required to receive a conventional threaded nut. Additionally, embodiments of the present invention obviate the need for a specialized cleaning tool, as any device (or manual force) capable of threading nuts can be utilized in conjunction with the present invention.

Embodiments described herein can include any number of brushes positioned on either the top or bottom surface of the nut (depending on the orientation of the inner threads), or within gaps in the inner surface of the nut orifice. These brushes may be either affixed to the nut directly or mounted to, for example, small cams positioned along the edge of the nut in sized gaps within the primary orifice of the nut. Leaf or coil springs further bias the brushes and prevent the brushes from rapidly losing their stiffness.

Referring now to FIG. 1, an embodiment of the invention is shown in which a nut 10 has a central orifice 11 and six outer sides 12a-12f. Each pair of six sides 12a-12f meets at corners 13a-13f (13e, 13f not visible in FIG. 1). While the embodiments herein are depicted with six sides, it can be appreciated that any shape, number of sides, and configuration of nut can be used, such as a square or octagonal nut, without departing from the scope of this disclosure.

Nut 10 also comprises two surfaces, 14a and 14b, which close off the top and bottom surfaces of the nut, respectively. Each surface 14a, 14b is fixed to the body of the nut 10 via a plurality of countersink fasteners 15a-15f, 16a-16f (only 15a-f visible in the depicted embodiment, in conjunction with the top surface 14a; 16a-f occupy corresponding locations on the bottom side.)

Also, in the depicted embodiment, the central orifice 11 comprises an inner edge 17, with threads 18 that can be of varying thickness and size to interact with threaded studs and shafts. Threads 18 of inner edge 17 are interrupted by two brush assemblies, 20a and 20b (20b only partially visible), which occupy the space near two of the corners 13c, 13d of nut 10. As with the number of sides in the nut body itself, while the depicted embodiment shows two brush assemblies 20a, 20b in conjunction with a six-sided nut, it can be appreciated that any number of brush assemblies could be used, ranging from a single brush assembly up to a 1:1 ratio of brush assemblies to corners (depending on the configuration of the body of nut 10).

Figure 2:
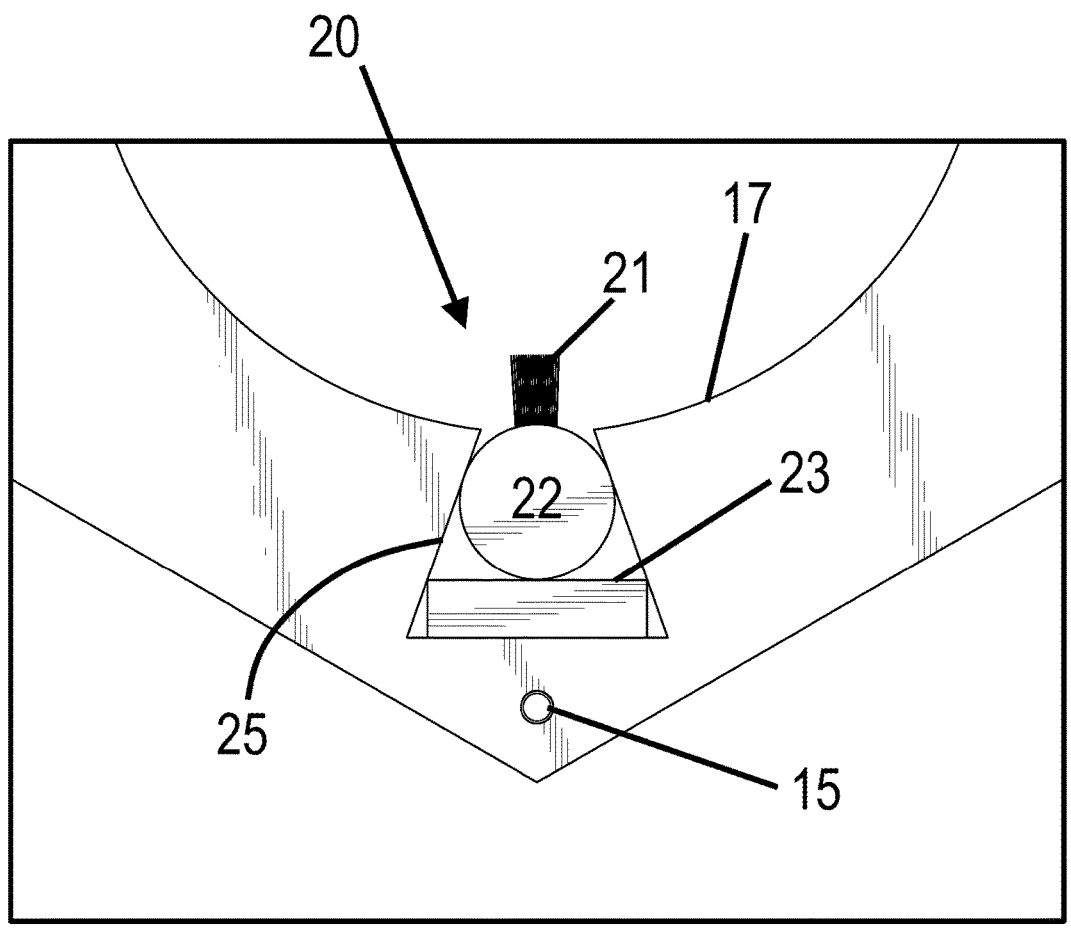
FIG. 2 depicts a detail top view of a corner of a brush nut usable within the scope of the present disclosure.

Referring now to FIG. 2, an exemplar brush assembly 20 is shown in a top-down view, with the top surface 14a absent from the drawing for clarity. Each brush assembly 20 can be located within a recess 25 located in the body of the nut 10, and can be preferentially located near a corner 13 to maximize the space available for the brush assembly 20 and the countersink fastener 15. Brush assemblies 20 each comprise three core components: brush bristles 21, cam 22, and biasing member 23.

Brush bristles 21 can be mounted on cam 22, and may be composed of any material with sufficient stiffness to abrade and remove corrosion from the threads of a corresponding threaded member 24 (shown in FIG. 4); exemplar materials may include brass and/or stainless steel bristles.

In FIG. 2, it can be seen that the cam 22 is allowed a limited degree of side-to-side movement as dictated by the dimensions of the gap created by recess 25 within inner edge 17. This allowance prevents bristles 21 from excess deformation during use, in either the threading or un-threading direction.

Similarly, biasing member 23 may be a spring, for example a leaf-spring or a coil-spring, or any configuration sufficient to bias cam 22 outward to counteract the tendency of brush bristles 21 to turn inward in the threading/unthreading direction of inner edge 17.

Figure 3:
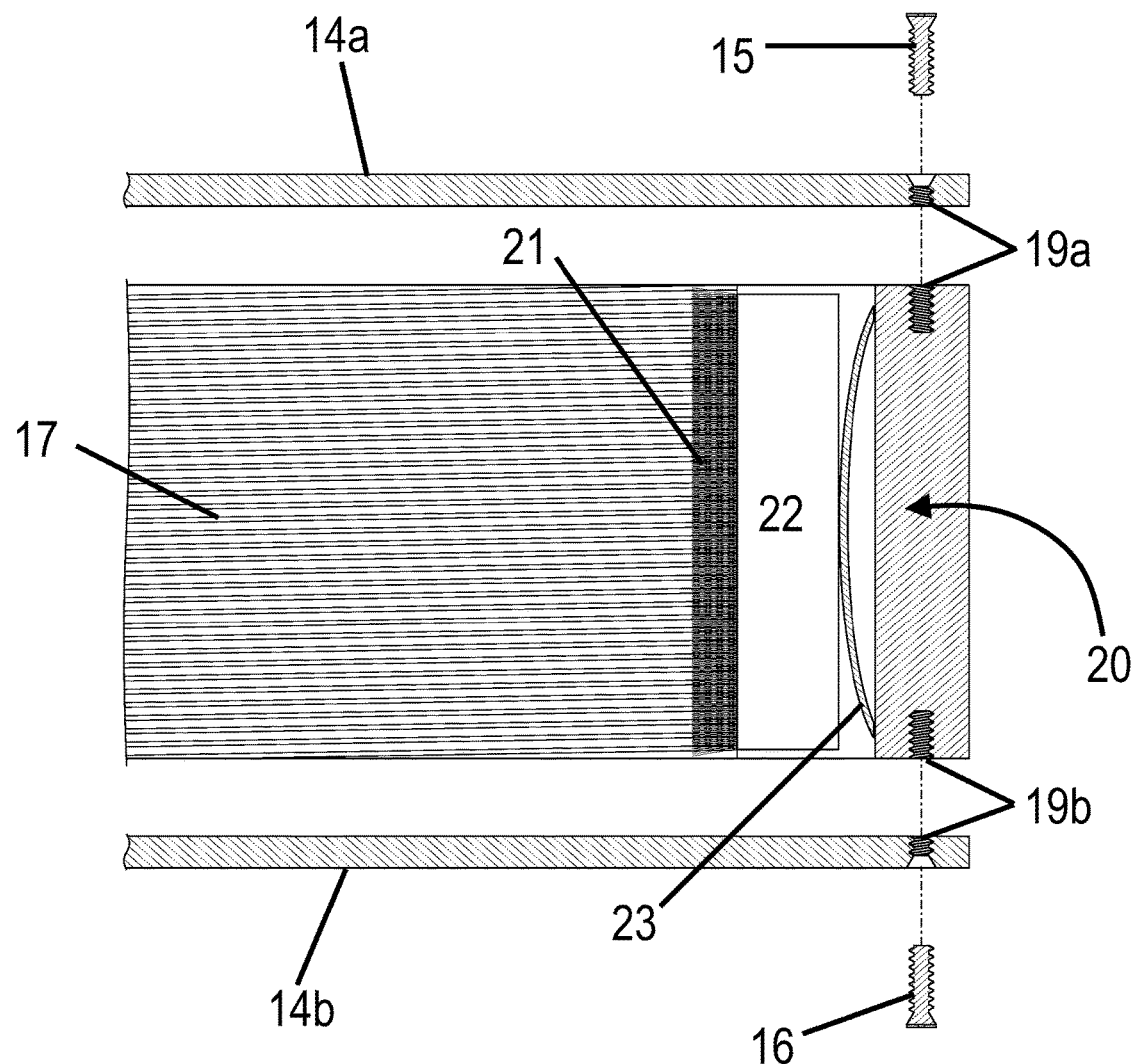
FIG. 3 depicts a detail cross-section view of a corner of a brush nut usable within the scope of the present disclosure.

Referring now to FIG. 3, a cross-section view of the brush assembly 20 is shown with the bristles 21, cam 22, and biasing member 23. It can be seen that the bristles 21 extend down the vertical length of the inner edge 17 to maximize the abrasive coverage during use of the nut.

FIG. 3 also shows the top and bottom surfaces of the nut 14a, 14b, which are attached at this corner utilizing countersink fasteners 15, 16, depicted as screws in this embodiment. Countersink bores 19a, 19b extend through surfaces 14a, 14b respectively, and further extend at least partially into to the body of the nut 10 at corner 13.

Thus, the countersink fasteners 15, 16 and surfaces 14a, 14b act to fix the brush assembly 20 within the recess 25 of the inner edge 17 of the nut 10, and also permit the brush assembly 20 to be easily removed, cleaned, flipped vertically, or replaced as required by the normal wear and tear of the tool.

Figure 4:
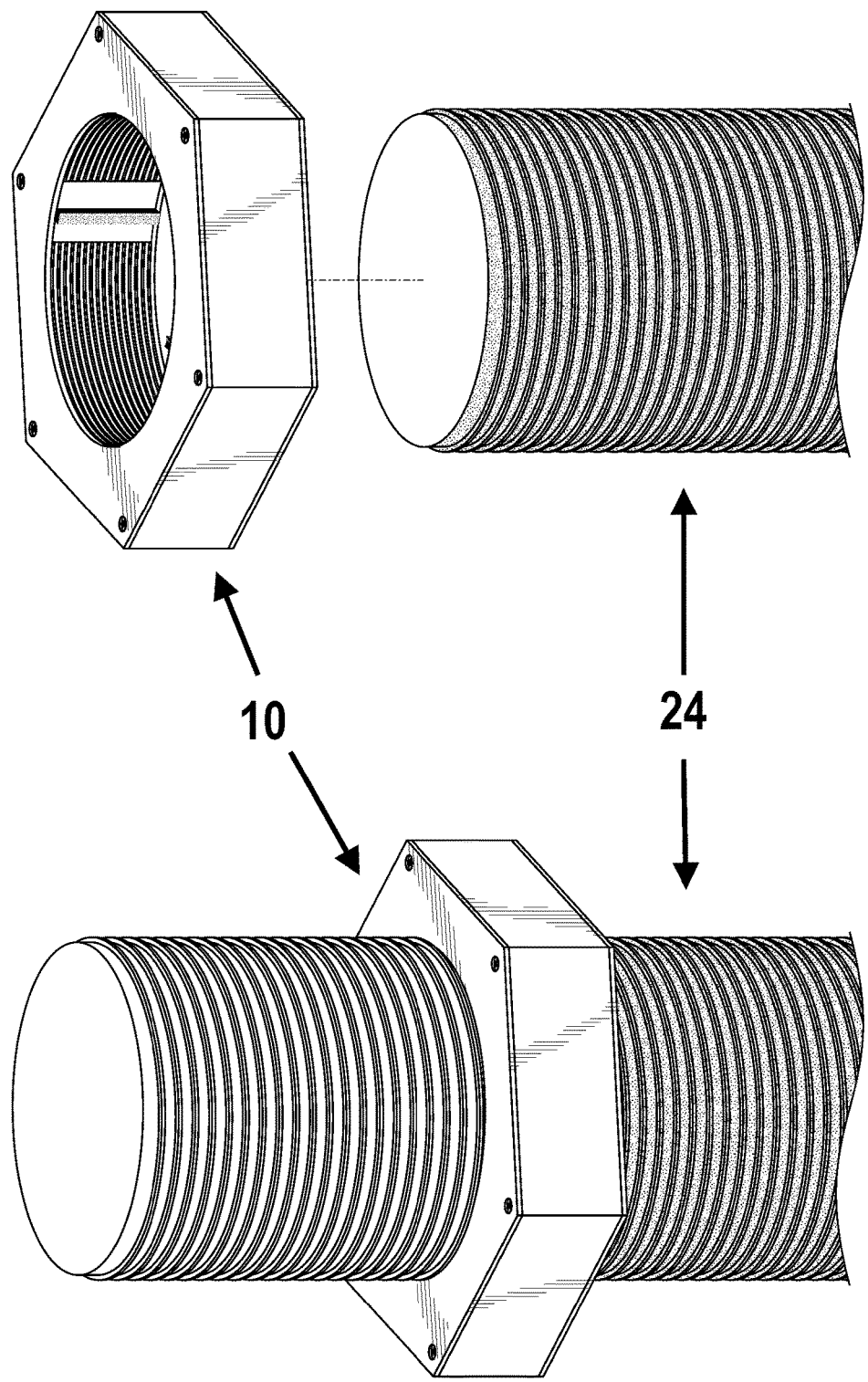
FIG. 4 depicts an embodiment of a brush nut interacting with a partially corroded threaded member according to the scope of the present disclosure.

FIG. 4 shows the nut 10 being driven along a corresponded threaded member 24, to remove corrosion and/or dirt. In use, the nut 10 can be mounted on a threaded member 24 and turned rapidly, allowing the brush assemblies 20 (not visible in FIG. 4) to abrade against threaded member 24, while the inner edge 17 (not visible in FIG. 4) directs the nut along the threaded member 24 in the usual fashion. The nut 10 can be turned by hand or with the use of a wrench or socket, however, a preferred embodiment of the method involves threading the nut 10 through the use of a pneumatic, hydraulic, or electric nut-running tool, which maximizes the abrasive force of the brushes against the threads to be cleaned.

Although the embodiment shown in FIGS. 1-4 utilizes countersink fasteners to allow for fastening and removal of the brush assembly, it can be appreciated that other embodiments may utilize alternative fasteners and/or methods for removal of the brush assembly. For instance, fasteners 15, 16 may be pins or camlocks. Alternatively, one or more surfaces of the recess 25, brush assembly 20, or the surfaces 14a and 14b may be magnetized, either with or without the use of countersinks, to better retain the brush assemblies 20 within their respective recesses 25. Alternatively, surfaces 14a and 14b may be chemically or mechanically affixed to the nut by gluing, soldering, or welding.

Additionally, while the depicted embodiment positions countersink fasteners 15a-f, and 16a-f at the corners 13a-f of the nut 10, it can be appreciated that other embodiments may locate the fasteners elsewhere on the nut, including along the sides 12a-12f of the nut.

While various embodiments usable within the scope of the present disclosure have been described with emphasis, it should be understood that within the scope of the appended claims, the present invention can be practiced other than as specifically described herein.

What is claimed is:

1. A tool for cleaning a threaded member, the tool comprising:
    a body having an orifice, a top surface, a bottom surface, an inner surface, and a plurality of outer surfaces, wherein each of the plurality of outer surfaces are offset with another of the plurality of outer surfaces for forming a respective plurality of corners, wherein at least one surface of the top surface or the bottom surface comprises a plurality of secondary orifices, each respective secondary orifice located at a respective corner, the at least one surface being attached to the body by a plurality of screws through the respective plurality of secondary orifices, and wherein the inner surface of the body comprises a plurality of threads;
    a plurality of brush assemblies, wherein each respective brush assembly is positioned at a respective corner of the plurality of corners, and wherein the brush assemblies extend inwards past the inner surface and into the orifice to engage the threads of the threaded member.

2. The tool of claim 1, wherein the inner surface additionally comprises a plurality of recesses, the plurality of recesses aligning with and extending towards the plurality of corners, and wherein the plurality of brushes are positioned within the plurality of recesses.

3. The tool of claim 2, wherein each the plurality of brush assemblies comprises a brush and a cam.

4. The tool of claim 3, wherein the plurality of recesses are comprise a width greater than the width of the plurality of brush assemblies.

5. The tool of claim 4, wherein the plurality of brush assemblies are removable from the plurality of recesses.

6. The tool of claim 3, wherein the each of the plurality of brushes comprises a plurality of brass bristles.

7. The tool of claim 3, wherein the each of the plurality of brushes comprises a plurality of stainless steel bristles.

8. The tool of claim 2, wherein each of the plurality of brush assemblies further comprises a biasing member, positioned within the respective plurality of recesses, to bias the cam and brush outward against the recess.

9. The tool of claim 8, wherein the biasing members of the plurality of brush assemblies are leaf springs.

10. The tool of claim 8, wherein the biasing members of the plurality of brush assemblies are coil springs.

11. The tool of claim 1, wherein the body of the tool comprises a nut.

12. The tool of claim 1, wherein the top and bottom surfaces are removable.

13. The tool of claim 1, wherein the top surface or the bottom surface further comprises a second plurality of secondary orifices, and wherein the second plurality of secondary orifices of the top surface or the bottom surface are aligned to receive a second plurality of screws.

14. A tool for cleaning a threaded member, the tool comprising:
   a body having an orifice, a top surface, a bottom surface, an inner surface, and a plurality of outer surfaces, wherein each of the plurality of outer surfaces are offset with another of the plurality of outer surfaces for forming a respective plurality of corners, wherein the inner surface of the body comprises a plurality of threads and a plurality of recesses, and wherein the plurality of recesses align with and extend towards the plurality of corners; and
   a plurality of brush assemblies comprising a brush and a cam, wherein each of the plurality of brush assemblies is positioned within the plurality of recesses at a corresponding one of the plurality of corners, and wherein the brush assemblies extend inwards past the inner surface and into the orifice to engage the threads of the threaded member, wherein the plurality of recesses comprise a width greater than the width of the plurality of brush assemblies.

15. The tool of claim 14, wherein each of the plurality of brush assemblies further comprises a biasing member, positioned within the respective plurality of recesses, to bias the cam and brush outward against the recess.

16. The tool of claim 15, wherein the biasing members of the plurality of brush assemblies are leaf springs.

17. The tool of claim 15, wherein the biasing members of the plurality of brush assemblies are coil springs.

18. The tool of claim 14, wherein the plurality of brush assemblies are removable from the plurality of recesses.

19. The tool of claim 14, wherein the top and bottom surfaces are removable.

20. The tool of claim 14, wherein the plurality of corners and at least one of the top surface or the bottom surface further comprises a plurality of secondary orifices, and wherein the plurality of secondary orifices of the plurality of corners and the plurality of secondary orifices of the at least one of the top surface or the bottom surface are aligned to receive a plurality of screws.

\* \* \* \* \*